United States Patent [19]

Simo

[11] Patent Number: 4,708,318

[45] Date of Patent: Nov. 24, 1987

[54] POST VALVE HANDLE

[75] Inventor: Donald M. Simo, Sheffield Lake, Ohio

[73] Assignee: The Scott & Fetzer Company, Westlake, Ohio

[21] Appl. No.: 889,767

[22] Filed: Jul. 28, 1986

[51] Int. Cl.$^4$ ............................................. F16K 31/60
[52] U.S. Cl. ................................... 251/292; 251/218; 403/383; 403/375
[58] Field of Search ............... 251/291, 292, 293, 218; 137/320, 321; 403/345, 360, 375, 383; 74/548

[56] References Cited

U.S. PATENT DOCUMENTS

| | | | |
|---|---|---|---|
| 2,078,567 | 4/1937 | Foregger | 251/218 |
| 3,503,586 | 3/1970 | Bordes | 251/291 |
| 4,012,155 | 3/1977 | Morris | 403/360 |
| 4,577,830 | 3/1986 | Winegeart | 251/291 |

FOREIGN PATENT DOCUMENTS

| | | | |
|---|---|---|---|
| 129486 | 1/1978 | German Democratic Rep. | 403/360 |
| 430172 | 6/1935 | United Kingdom | 251/291 |

Primary Examiner—A. Michael Chambers
Assistant Examiner—John C. Fox
Attorney, Agent, or Firm—Pearne, Gordon, McCoy & Granger

[57] ABSTRACT

A valve and handle assembly is disclosed for controlling the flow of breathing oxygen from lightweight oxygen cylinders. The valve provides a stem extending from the valve formed with a plurality of barbs which provide ramps and shoulders. The stem also provides opposed wrenching flats. A handle formed of polyvinyl chloride or the like is provided with a through bore having ramps and shoulders proportioned to mate with ramps and shoulders on the stem. The handle also provides opposed flats. The handle is sufficiently elastically deformable to allow it to be assembled on the stem by axial movement. After assembly, the shoulders on the handle engage shoulders on the stem to permanently secure the handle in position. When installed, the handle returns to a substantially unstressed condition so that crack-inducing stresses do not exist in the material forming the handle and a permanent, strong connection is provided between the handle and the stem.

6 Claims, 4 Drawing Figures

POST VALVE HANDLE

BACKGROUND OF THE INVENTION

This invention relates generally to valves for compressed gas, and more particularly to a novel and improved valve stem and handle assembly particularly suited for valves used on cylinders such as oxygen cylinders for medical purposes.

PRIOR ART

Patients suffering from chronic obstructive pulmonary disease often require oxygen to assist in their breathing. Such patients often keep a lightweight aluminum cylinder containing compressed breathing oxygen available for use when needed. Valves provided on such cylinders are closed when oxygen is not required, but must be easily openable when oxygen is needed. Ease of operation of such valves is very important, since such patients are often feeble.

It is known to provide valves for compressed gas cylinders such as oxygen cylinders that have a wing-type handle mounted on the valve stem in combination with a wrenching projection permitting a separate wrench to be applied and used to close the valve tighter than is practical with the winged handle. Conversely, the separate wrench can be used to open a valve which has been very tightly closed.

It is also known to form such a valve with a metal stem having barbs, and to apply a plastic winged handle with a smooth opening positioned over the barbs with a press-fit to mount the handle on the stem. Difficulty has been encountered with such assemblies. In some cases, the stresses set up in the plastic winged handle have caused the handle to crack or break in use. Further, after use for a period of time, such winged handles have sometimes loosened and slipped off the stem, particularly when the cylinder was carried by the winged handle.

SUMMARY OF THE INVENTION

In accordance with the present invention, a novel and improved mechanically interlocking stem and handle structure is provided which can be easily assembled and after assembly provides a permanent connection. Such connection does not impose significant stresses on the handle. Therefore, breaking or cracking of the handle is eliminated, and the connection remains secure even after the assembly has been used for long periods of time.

In the illustrated embodiment, a metallic stem is provided with barbs supplying a plurality of ramps and substantially radial shoulders. A winged handle is formed of an elastically deformable material and is also provided with ramps and shoulders which mate with the ramps and shoulders of the stem.

During assembly, the ramps cause the material of the handle to yield within its elastic limit so that the handle can be assembled on the stem by simply pressing the handle onto the stem to its installed or assembled position.

Once in the installed position, the material elastically returns to its substantially unstressed condition, causing the opposed shoulders to interfit and provide a strong and positive mechanical interconnection between the stem and the winged handle.

Because the stresses are relieved, the handle does not crack or break in normal use. Further, extended use of the assembly does not cause the handle to loosen. Therefore, the handle does not come off the stem even when the handle is used to carry the cylinder.

These and other aspects of this invention are illustrated in the accompanying drawings, and are more fully described in the following specification.

DETAILED DESCRIPTION OF THE DRAWINGS

Figure 1:
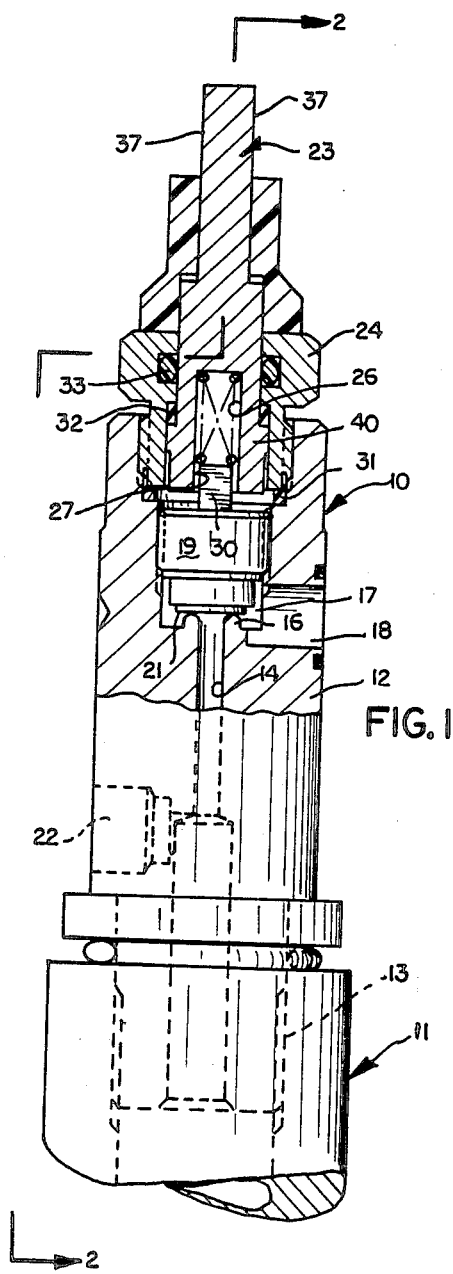
FIG. 1 is a side elevation in partial longitudinal section of a valve incorporating a handle and stem assembly in accordance with the present invention.

The illustrated embodiment of this invention involves a valve 10 particularly adapted for mounting on an oxygen cylinder 11 of the type used to supply breathing oxygen to patients. Usually, such cylinder is relatively lightweight, formed of aluminum, so that it can be easily transported by the user. The valve 10 provides a valve body 12 which is provided with threads 13 at its inner end so that it can be threaded into the cylinder 11. The valve body is provided with passage means 14 open at the inner end to the cylinder 11 and open at its outer end through a valve seat 16 to a valve chamber 17 and an outlet port 18.

A valve poppet 19 is provided with external threads which mate with internal threads in the body 12 so that it can be threaded back and forth toward and away from the valve seat. The inner end of the poppet is provided with a seal 21 which engages the valve seat in the valve-closed position to isolate the outlet port 18 from the passage 14. In the particular embodiment illustrated, a second port 22 is provided in the valve body 12 to permit the installation of a pressure gauge which indicates the pressure of the oxygen within the cylinder 11.

Operation of the valve is provided by a valve post or stem 23 which extends through a gland nut 24 threaded into the outer end of the body 12. The valve stem 23 is provided with a blind passage 26 extending along its central axis and a cross slot 27 at the open end of the blind passage 26. A crossbar 30 is provided at the outer end of the valve poppet 19 which fits into the cross slot 27 to prevent relative rotation between the valve stem and the poppet while allowing relative axial movement therebetween. Consequently, rotation of the valve stem causes rotation of the valve poppet to open and close the valve. However, during such rotation, the valve stem does not move axially of the body, even though the poppet is threaded back and forth between the open and closed position of the valve. Seals 31 and 33 provide a fluidtight joint between the valve body 12 and the gland nut 24, and, in turn, between the gland nut 24 and the valve stem 23. A spring 35 located in the passage 26 biases the stem 23 in an outward direction. A shoulder 40 engages a thrust element 32 to prevent axial outward movement of the stem. The valve thus far described is a conventional valve used in pressure cylinders for oxygen, and forms no part of this invention except to the extent it is combined with a stem and handle structure described below.

The valve stem 23 provides a cylindrical portion 34 extending through the seal 33 and beyond the gland nut 24. Outwardly of the cylindrical portion 34, the valve stem provides a pair of opposed wrenching flats 37 and three stepped barbs 36, best illustrated in FIG. 4. The wrenching flats extend from the outer end 38 of the valve stem to a location substantially adjacent to the cylindrical portion 34.

Each of the stepped barbs provides a ramp surface 39 which is a portion of a cone and extends with increasing radius toward the cylindrical portion. At the inner end of each of the ramp surfaces 39 is a radially extending shoulder 41. In the illustrated embodiment, the ramp surfaces are provided with a very shallow angle and extend to a maximum diameter substantially equal to the diameter of the cylindrical portion 34.

Figure 4:
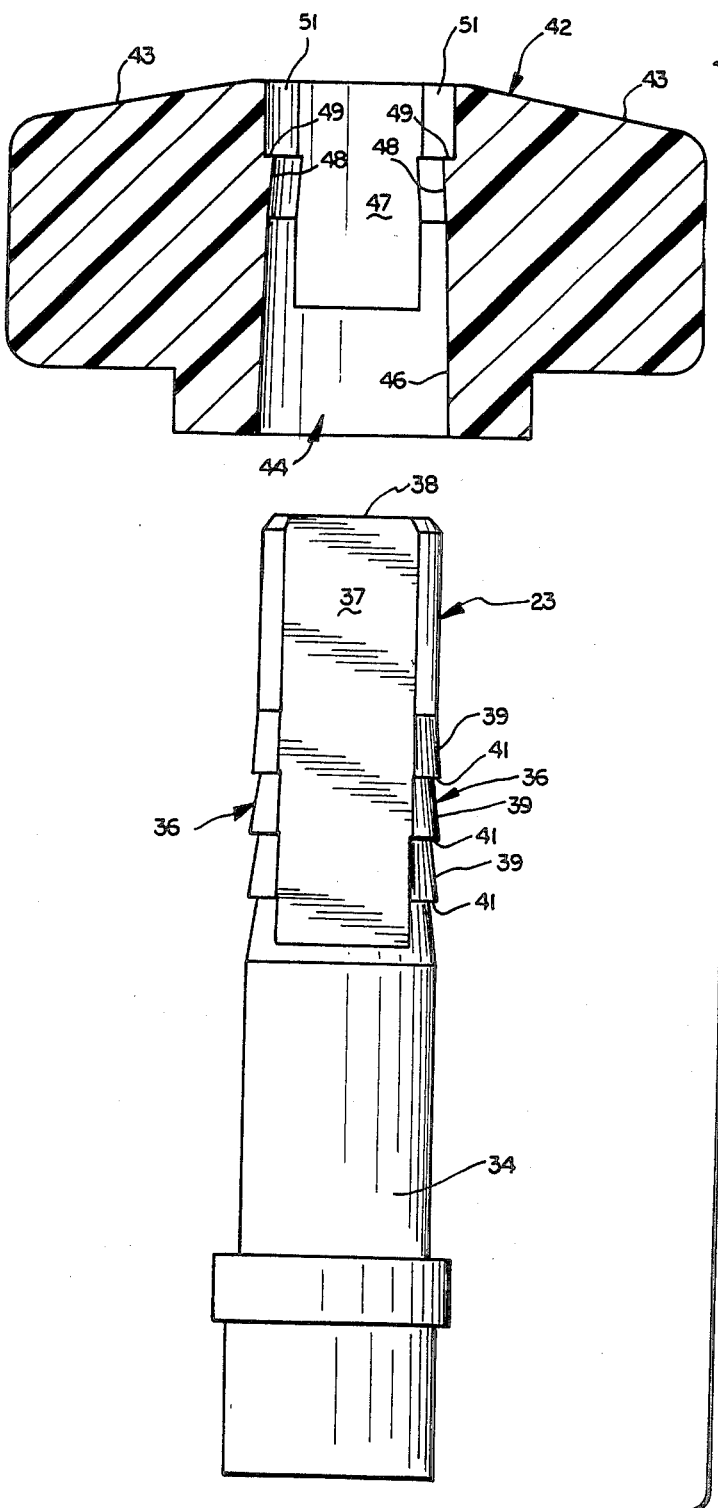
FIG. 4 is an enlarged, exploded view illustrating the handle and stem prior to assembly.

A wing-type valve handle 42, illustrated in FIG. 4, prior to its assembly on the valve stem, is provided with a pair of wings 43 and a central passage 44. The central passage is provided with an inner cylindrical portion 46 sized to closely fit over the cylindrical portion 34 of the stem and a pair of flats 47 which closely fit the flats 37 on the stem to prevent relative rotation between the handle and the stem when the handle is assembled on the stem. In addition, the central passage 44 is formed with a pair of opposed ramp surfaces 48 extending with reducing diameter in the outward direction to a radially extending shoulder 49. The angle of the ramp surfaces 48 is such that the ramp surfaces 48 of the handle mate with the ramp surfaces 39 of the barbs 36 on the stem and the shoulders 41 and 49 are sized to mate with each other after assembly. Outwardly of the shoulders 49, the handle provides a pair of semicylindrical portions 51 which are separated by the flats 47.

Figure 2:
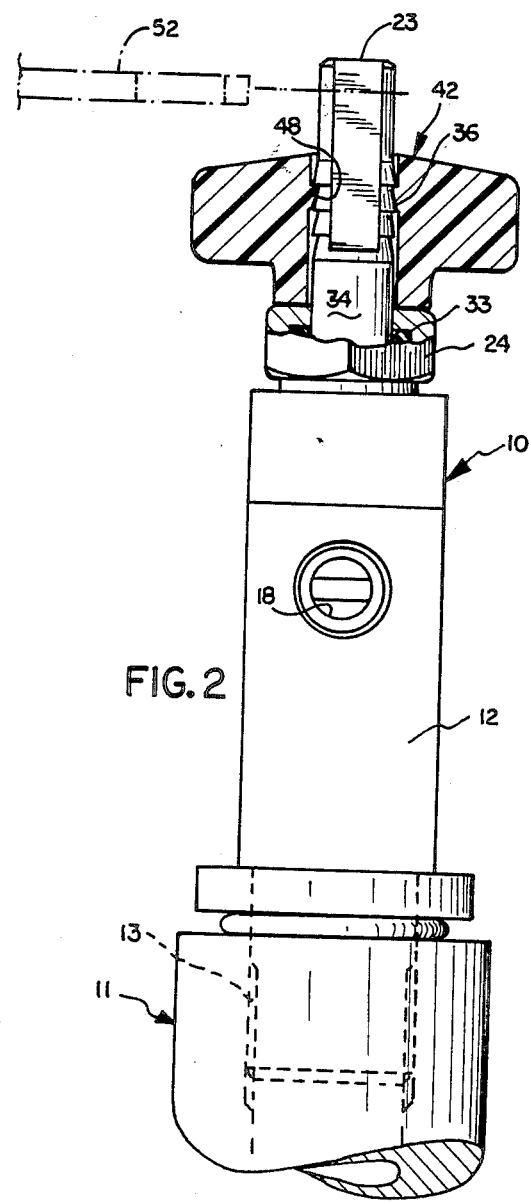
FIG. 2 is a side elevation partially in longitudinal section, taken along line 2—2 of FIG. 1.
Figure 3:
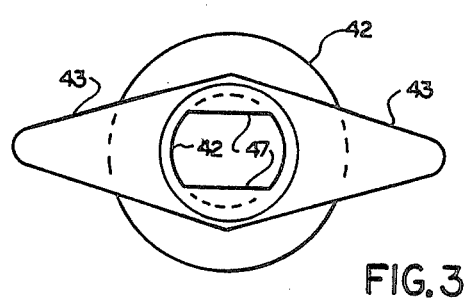
FIG. 3 is an end view of the handle.

The handle 42 is preferably molded from polyvinyl chloride-type plastic which is slightly elastic so that the handle can be installed on the stem by merely pressing the handle axially of the stem to the installed position illustrated in FIGS. 1 and 2. When the ramps 48 engage the outermost ramp 39, the material of the handle 42 is elastically deformed within its elastic limit until the shoulder 49 is positioned adjacent to the outermost shoulder 41 on the stem. In such position, the material of the handle elastically returns to its substantially unstressed condition, and the two shoulders 41 and 49 move into axial abutting engagement to permanently lock the handle on the valve stem. Because the handle is not subjected to continuing stress after installation, the tendency for the handle to break or crack in use is eliminated. Further, because a positive mechanical locking engagement is provided rather than a friction lock, the handle does not become loose during use and does not slip off the stem even when the cylinder is carried by the handle.

Although the illustrated embodiment provides a handle with only a single pair of ramps and shoulders on opposite sides of the flats, it is within the scope of this invention to provide additional ramps and shoulders within the handle to interlock with the inner ramps and shoulders on the stem if additional strength is required to resist separation of the handle and stem.

Further, in the present embodiment, the stem 23 is formed to extend beyond the upper surface of the handle 52 so that a wrench 52, schematically illustrated in FIG. 2, can be used to open and close the valve. For example, in some cases where the cylinder is to be stored for an extended period of time, it is desirable to tighten the valve with greater force to ensure that leakage does not occur over a period of time. Similarly, the wrench 52 can then be used to loosen the valve. In normal use, however, the winged handle 42 may be used to open and close the valve.

With the present invention, simple structure is provided which allows easy assembly of the handle on the stem without any special tooling or the like, and once the handle is assembled onto the stem, it is permanently held in place and provides a reliable structure for the operation of the valve.

Although the preferred embodiment of this invention has been shown and described, it should be understood that various modifications and rearrangements of the parts may be resorted to without departing from the scope of the invention as disclosed and claimed herein.

What is claimed is:

1. A valve and handle assembly comprising a valve body assembly, a valve stem rotatably mounted on said body assembly for opening and closing said valve, said stem providing an elongated projecting portion extending from said body assembly and providing axially extending wrenching flats, and barbs intermediate said flats substantially adjacent to said body assembly, said barbs providing axially extending ramps extending toward said body assembly with increasing diameter and terminating in substantially radially extending locking shoulders, and a handle formed of elastically deformable material providing a circumferentially continuous through bore having mating internal flats and internal ramps and shoulders proportioned to closely fit said barbs and flats on said stem, said handle being assembled on said stem by axial movement along said projection to an installed position causing mating ramps on said handle and stem to interengage and elastically deform said handle as said mating ramps move relative to each other to said installed position, said deformation of said material of said handle elastically returning to a substantially unstressed condition in said installed position on said stem and being permanently retained in such position against relative axial movement by interengagement of said shoulders, said mating flats on said stem and handle preventing relative rotation between said handle and stem, whereby said valve is opened and closed by rotating said handle without causing wear of said mating ramps and shoulders.

2. A valve and handle assembly as set forth in claim 1, wherein said body assembly provides a gland nut, said stem provides a cylindrical portion extending through said gland nut and beyond said gland nut a short distance, said through bore provides a handle cylindrical portion extending along said stem cylindrical portion to a location adjacent said gland nut, and said mating ramp and shoulders on said handle are spaced from said gland nut.

3. A valve and handle assembly as set forth in claim 1, wherein said stem projects beyond said handle providing a projecting wrenching portion shaped to permit a wrench to be applied to said stem to operate said valve.

4. A valve and handle assembly as set forth in claim 3, wherein said handle provides oppositely extending wings permitting the handle to be grasped and turned by hand.

5. A valve and handle assembly as set forth in claim 4, wherein said handle is molded polyvinyl chloride material.

6. A valve and handle assembly as set forth in claim 4, wherein said valve is mounted on a cylinder filled with breathing oxygen, and said interengaging shoulders provide sufficient strength to permit said cylinder to be carried by said handle.

* * * * *